KEENEY & SEE.
Corn Planter.
No. 79,576.  Patented July 7, 1868.
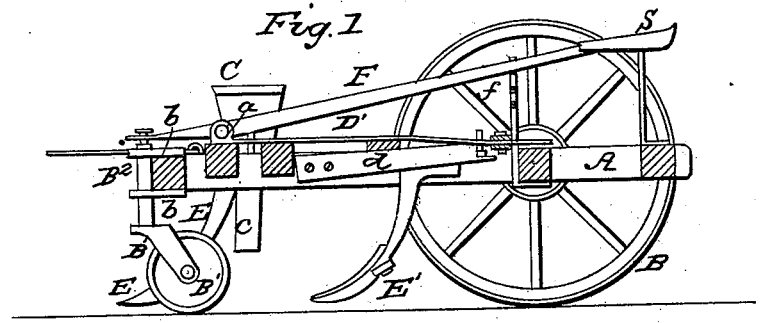
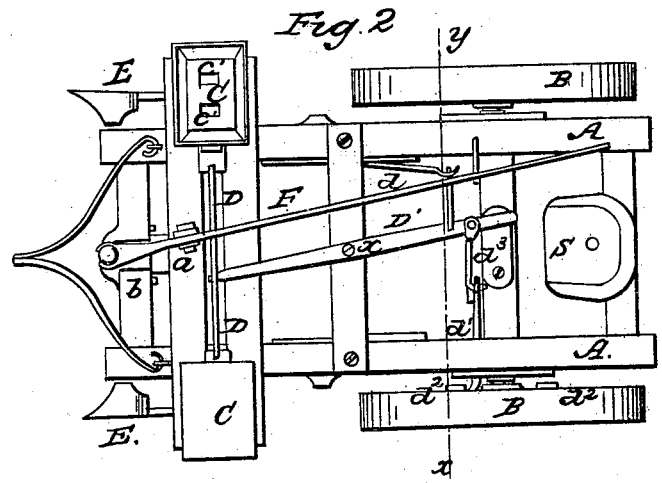
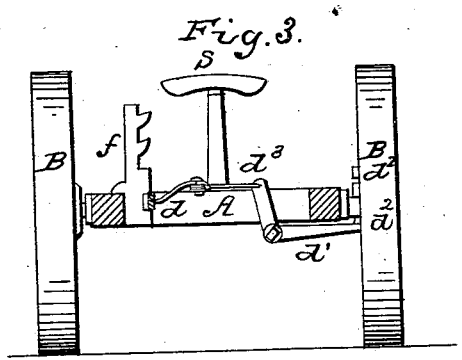
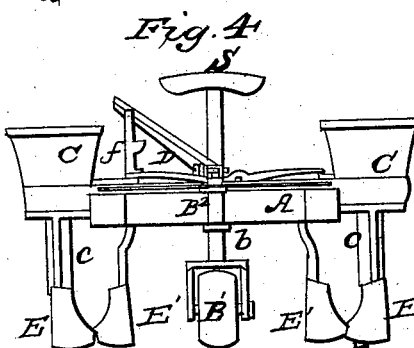
witnesses
H. Paulin
R. Simon
Inventors
Harris Keeney
Charles H. See
By their Attys
M. Randolph & Co

United States Patent Office.

HARRIS KEENEY, OF DANVILLE, AND CHARLES H. SEE, OF NEW FLORENCE, MISSOURI.

Letters Patent No. 79,576, dated July 7, 1868.

IMPROVEMENT IN CORN-PLANTER.

*The Schedule referred to in these Letters Patent and making part of the same.*

TO ALL WHOM IT MAY CONCERN:

Be it known that we, HARRIS KEENEY, of Danville, and CHARLES H. SEE, of New Florence, both in the county of Montgomery, and State of Missouri, have made certain new and useful Improvements in Corn-Planters; and we do hereby declare that the following is a full and clear description thereof, reference being had to the accompanying drawings, and to the letters of reference marked thereon.

This invention relates to a machine for planting corn or other like seeds by horse-power. The especial features of the invention relate to an attachment for operating the seed-dropping machinery; also, to an arrangement of the marking and covering-plows; and finally, to an arrangement of caster-wheel for carrying the front end of the frame of the machine.

To enable those skilled in the art to make and use our improved planter, we will proceed to describe its construction and operation.

Figure 1 of the drawings is a sectional elevation of one of the improved planters.

Figure 2 is a plan of the same.

Figure 3 is a transverse sectional elevation, taken on the line $x\,y$ of fig. 2; and Figure 4 is a front elevation.

The frame A of the machine is mounted on two wheels, B, and a caster, $B^1$. The seeds to be planted are to be placed in the hopper C, from which they drop into the ground through the spouts $c$. The sliding bar D has its ends located beneath the hoppers C, and it is operated by a reciprocating motion, so as to open or close the holes $c'$ in the bottoms of the hoppers, at the proper times to drop the seeds where required. The mode of operating the bar D is by means of the lever D', the spring $d$, the bent lever $d^1$, and the lugs $d^2$, attached to one of the wheels B. The form and construction of the bent lever $d^1$ are clearly shown in fig. 3, and it is pivoted, at or near its elbow, by means of a bolt, to the frame A or the axle of the machine. The horizontal arm of this lever is arranged to be struck by the lugs $d^2$ as the wheel B revolves. These lugs are affixed to the inner face of the wheel B, at an angle of, say, thirty or forty degrees from a radial line bisecting them, and consequently, as they revolve, they strike the end of the lever a glancing blow, and cause its vertical arm to move laterally in a sharp, quick motion. The upper end of the vertical arm is connected, by means of a link, $d^3$, with the rear end of the lever D', and this lever being pivoted to the frame A at $x$, the required motion is given to it and the slide D, to produce the dropping-operation. The spring $d$, affixed to the frame A, on the opposite side from the bent lever, is connected, by means of a link, with the back end of the lever D', and operates upon it and the said bent lever so as to draw it into contact with the lugs on the wheel, and thus the proper motion for the bar D is produced and maintained. The plows E are attached to the frame A in advance of the feed-spouts $c$, so as to open the furrow for the reception of the seed, and the plows E' are attached to the said frame, behind the said seed-spouts, so as to cover the seeds after they shall have been properly dropped in the ground. The plows E are arranged to turn the soil in one direction, *i. e.*, either in or out, and then the plows E', following after, turn the soil in the opposite direction, so as to turn the loosened soil back upon the planted grain, thereby facilitating its sprouting better than could be done if it were covered by hard earth, as is usually the case. The caster $B^1$, on which the front end of the machine rests, not only facilitates the turning of the machine, but also serves to regulate the depth to which the plows are to run in the ground. The upper end of the caster-stand, $B^2$, passes up through the lugs $b$, attached to the frame A, so as to allow the caster to turn in them, and a groove in it receives the forward end of the lever F. This lever is fulcrumed to the frame A at $a$, and a rack, $f$, near the driver's seat S, receives the back end of the said lever F. When the driver desires, he may raise or depress the end of the said lever F in the said rack $f$, and thus raise or lower the forward end of the frame A on the wheel $B^1$, and thereby regulate the running depth of the machine.

When it is desired to stop the dropping-operation while the machine is in motion, the plows may be raised up out of the ground by means of the lever F, and the link $d^3$ may at the same time be detached from the lever $d^1$, so as to stop the dropping operation.

Having described our invention, what we claim, is—

1. The combination and arrangement of the devices D D' $d\ d^1\ d^2\ d^3$, for dropping the seeds, substantially in the manner herein shown and described.

2. The caster-wheel $B^1$, the lever E, and rack $f$, when arranged, with reference to each other, and to the frame A, as herein described, for the purpose of turning and elevating the front end of the machine.

HARRIS KEENEY,
CHAS. H. SEE.

Witnesses:
    THOS. J. POWELL,
    CHAS. STEWART,
    H. PAULI.